Oct. 16, 1928.

R. LUDOWICI 1,688,051

TRACTION RIM FOR AUTOMOBILES, TRUCKS, AND THE LIKE

Filed May 19, 1927

Inventor

Russell Ludowici

By Clarence A. O'Brien
Attorney

Patented Oct. 16, 1928.

1,688,051

UNITED STATES PATENT OFFICE.

RUSSELL LUDOWICI, OF SCHENECTADY, NEW YORK.

TRACTION RIM FOR AUTOMOBILES, TRUCKS, AND THE LIKE.

Application filed May 19, 1927. Serial No. 192,653.

The present invention relates to a rim which may be attached to the wheels of automobiles, trucks, and the like in order that they may be used as tractors about the farm.

A very important object of the invention lies in the provision of a traction rim structure of this nature having inwardly directed lugs which may be bolted onto the felly of a wheel in the same manner as the ordinary demountable rims are connected therewith.

Another very important object of the invention lies in the provision of a rim which is circumferentially reinforced by a central bead and side beads and has a plurality of cleats on the periphery thereof extending diagonally.

Another very important object of the invention resides in the provision of a rim structure having cleats thereon which comprise angularly disposed portions, one portion of each cleat being securely welded or otherwise fixed to the periphery of the rim and the other portion thereof radiating outwardly therefrom, the portion adjacent the felly being reinforced and the radiating portion having an edge bead continued along the ends of the other portion.

A still further very important object of the invention lies in the provision of a rim structure of this nature which is simple in its construction, inexpensive to manufacture, strong and durable, thoroughly efficient and reliable in use, easy to attach to the felly of a wheel, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
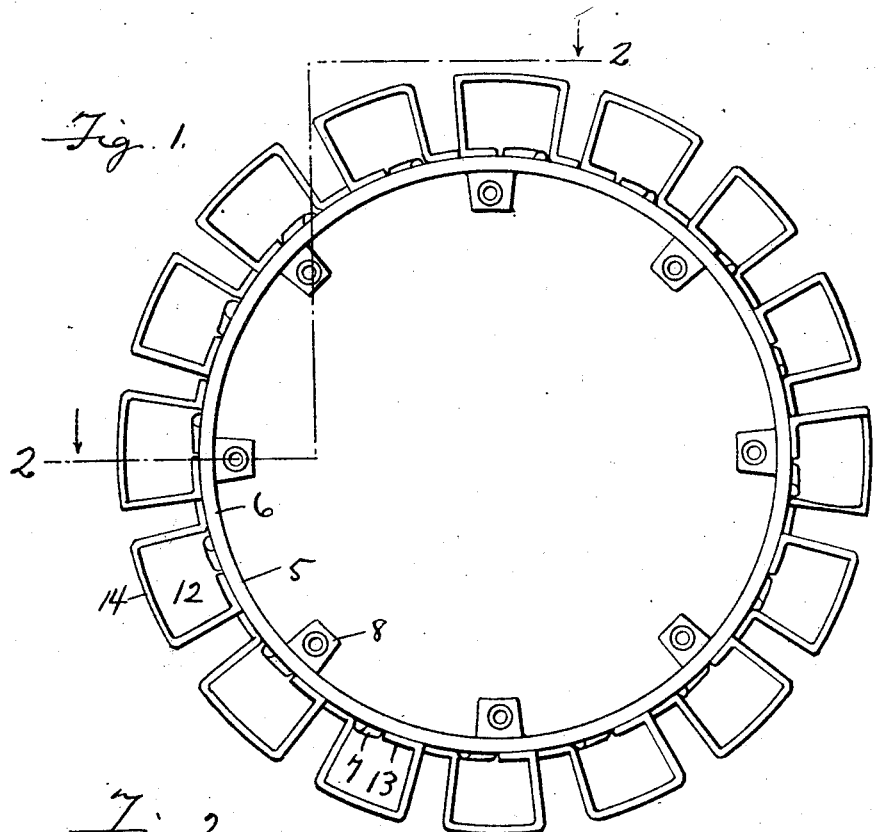
Figure 1 is a side elevation of a rim embodying the features of my invention.
Figure 2:
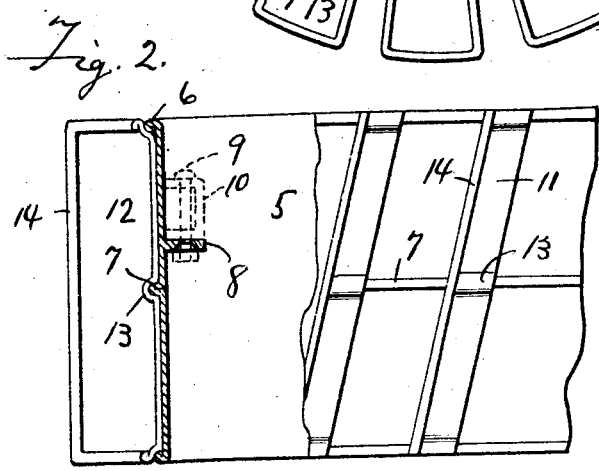
Figure 2 is a detail sectional view taken substantially on the line 2—2 of Figure 1 looking in the direction of the arrows.
Figure 3:
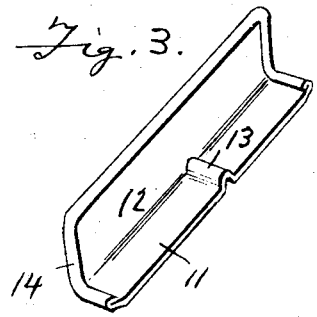
Figure 3 is a perspective view of one of the cleats.

Referring to the drawing in detail it will be seen that the numeral 5 denotes the body of the rim which is in the form of an annulus having its edges beaded as at 6 and provided with a central circumferential bead 7. Between one of the side beads 6 and the central bead 7 there are disposed a plurality of inwardly radiating lugs 8 spaced to receive the bolts from the felly of a wheel so that this rim will take the place of an ordinary rim on an automobile or truck wheel. These bolts are indicated in dotted lines in Figure 2 at 9 and the felly is indicated at 10.

Across the periphery of the felly there are disposed a plurality of cleats positioned diagonally. Each cleat comprises portions 11 and 12 perpendicularly disposed to each other. The portion 11 is welded or otherwise secured diagonally across the felly and has a central bead 13 to sit over the bead 7 of the rim body 5. The ends of the portion 11 and the edges of the portion 12 have a continuous bead 14. Thus these cleats are thoroughly reinforced and will absolutely prevent the tendency of the rim to slip in mud and the like.

It will be seen that this device will be thoroughly efficient and reliable for the purpose intended, may be installed quickly on a wheel felly, and is strong and durable.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or without sacrificing any of its advantages.

Having thus described my invention, what I claim as new is:—

A device of the class described comprising a rim body formed with continuous side beads and a continuous central bead, and cleats disposed on the periphery of the rim body, each cleat comprising a base flange and a radial flange, said base flange being securely fixed to the rim body diagonally thereof, a continuous reinforcing means disposed about the edges of the radial flange and across the ends of the base flange, said base flange being provided with a central bead to accommodate the central bead on the rim body and the ends of the base flange being curved outwardly from the rim body to fit over the continuous side beads.

In testimony whereof I affix my signature.

RUSSELL LUDOWICI.